United States Patent Office 3,151,288
Patented Sept. 29, 1964

3,151,288
FIELD CONTROL CIRCUIT FOR MULTIPLE PHASE ALTERNATORS
Algirdas A. Avizienis, Pasadena, Calif., and Howard L. Gerber, Chicago, Ill., assignors to Barnes & Reinecke, Inc., a corporation of Delaware
Filed May 16, 1961, Ser. No. 110,437
6 Claims. (Cl. 322—28)

This invention is concerned with control circuits for alternators, and more specifically is directed toward a field control circuit for multiple phase alternators driving variable load devices.

To provide a substantially constant output voltage, conventional three phase alternators require some means for adjusting the field excitation where the output voltage would otherwise vary as a result of varying load conditions. It is possible to accomplish this result by using conventional circuits having at least two and commonly three phase controlled rectifiers. This method is relatively costly and complex.

Herein, the invention is disclosed with reference to an alternator providing a three phase output to a full wave rectifier for providing a direct current to a variable load device; it is to be understood, however, that the invention is equally well applicable to such a system wherein the rectifier is eliminated and the alternator supplies power to an alternating current variable load. Herein, the term variable load is defined as a load which draws a wide range of currents.

It is therefore a principal feature of this invention to provide an improved control circuit for a three phase power supply using a single silicon control rectifier and means rectifying only five half-phases of the three phase output of the alternator, leaving the sixth half-phase for use as a reset signal.

Another feature of the invention is the provision of a regulator circuit for a multiple phase alternator which includes a field winding comprising a rectifier assembly including a plurality of rectifying devices connected to the output of the alternator for providing a direct current therefrom. A variable load device is connected to the assembly for utilizing the direct current and for developing an error signal under varying load conditions. Further, a regulator trigger circuit connected to the load device is provided for developing a trigger signal in response to the error signal. A regulator field control circuit including a semi-conductor switching device coupled between the rectifier assembly and the field winding is provided for energizing the field winding in response to the trigger signal.

A further feature of this invention is the provision in such a field control device of a high gain amplifier circuit and a time delay network for developing a firing signal for energizing the regulator field control circuit.

It is a further feature of this invention to provide an all-transistor field control circuit for a three-phase alternator including a silicon controlled rectifier connected to each of two branches of a rectifier bridge through diodes.

It is a further feature of the invention to provide a rectifier circuit having transistor devices to improve the control characteristics of a three-phase alternator.

Further features and advantages of the invention will more readily be apparent from the following specification and from the drawings, in which.

Figure 1:
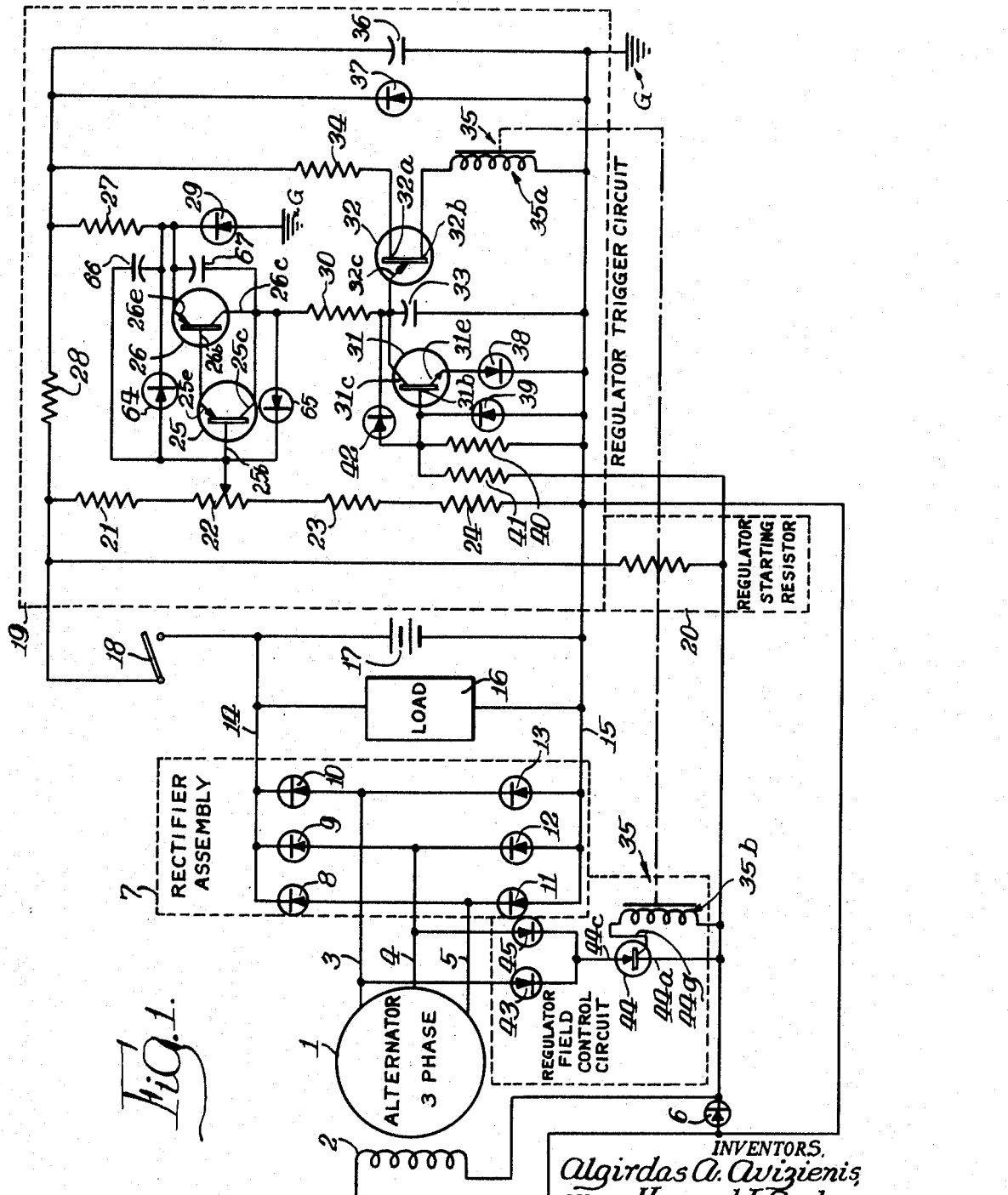
FIGURE 1 is a schematic diagram showing one embodiment of the invention.

In the exemplary embodiment of the invention as disclosed in the drawing, a conventional three phase alternator 1 is shown having a shunt field winding 2 and driven by suitable means (not shown) to produce a three phase voltage at terminals 3, 4 and 5. A diode 6 is connected in parallel across the field winding 2 to provide inverse voltage protection and to provide a circuit for sustained inductive current flow in the field 2.

The output of the alternator is connected to a rectifier assembly 7 consisting of a plurality of diodes 8, 9, 10, 11, 12 and 13 to provide a full wave rectification of the three phase voltage. Terminal 3 is connected between diodes 10 and 13, terminal 4 between diodes 9 and 12, and terminal 5 between diodes 8 and 11. The rectifier assembly has output terminals 14 and 15 to which the load 16 may be connected.

Load 16 may comprise a variable load wherein the current drawn thereby may vary, and thereby normally cause a voltage change in the output of the three phase alternator. The present invention comprehends means responding to any such voltage change to develop a trigger signal which is utilized to control a switch connected in series with the field rectifier providing direct current to the field. Herein, the trigger signal is developed in a regulator trigger circuit 19 connected in parallel with the load.

Further, across the output terminals 14, 15 is connected a battery 17 for filtering the alternator output and biasing the trigger circuit 19. A switch 18 is connected in series with trigger circuit 19 and a regulator starting resistor 20 connected in parallel therewith.

The ignition switch 18 and terminal 15 of the rectifier assembly are connected across a voltage dividing network consisting of resistors 21, 22, 23 (preferably temperature compensated) and 24 of approximately 500 ohms, 500 ohms, 560 ohms and 1100 ohms, respectively. Terminal 15 is also connected to one side of the regulator starting resistor, to the field winding 2, and to a point of reference potential such as ground G.

The regulator trigger circuit also includes an amplifying circuit consisting of a transistor 25 and a transistor 26 connected in a standard circuit arrangement to provide a high gain amplifier circuit which is connected between a variable resistor 22 and a resistor 27, in turn connected through a resistor 28 to the ignition switch 18. A Zener diode 29 is connected between the emitter 26e of transistor 26 and ground G to regulate the voltage at this point. The collectors 25c and 26c of transistors 25 and 26 are connected through resistor 30 to a common point between the collector 31c of a transistor 31, the rectifying junction 32c of a field effect or unijunction transistor 32, and a capacitor 33. The other terminal of capacitor 33 is connected to ground G. Transistor 32 has one ohmic contact 32a connected through a resistance 34 to resistor 28 and its other ohmic contact 32b connected through the primary winding 35a of a transformer 35 to ground G. A condenser 36 and a Zener diode 37 are connected in parallel across the common point between resistors 27 and 28 and ground G to regulate the voltage at this point. The emitter 31e of transistor 31 is connected through a diode 38 to ground G and the base connection 31b of transistor 31 is connected through a diode 39 to ground G. The base 31b of transistor 31 is also connected through a resistance 40 to ground G and through resistance 41 to the regulator starting resistor terminal connected to field winding 2. A diode 42 is connected between the collector and the base 31b of transistor 31.

A regulator field control circuit is provided including a diode 43 connected between terminal 3 of the alternator and the cathode 44c of a silicon controlled rectifier 44 effectively defining an electronic switch controlled by the trigger signal. A diode 45 is connected between terminal 4 of the alternator 1 and the cathode 44c of rectifier switch 44. The anode 44a terminal of the silicon control rectifier switch 44 is connected to the field winding 2 of the alternator. The secondary 35b of transformer 35 is connected between the gate electrode 44g and the anode 44a of the silicon controlled rectifier switch 44.

The field control circuit which contains the silicon controlled rectifier switch which is connected between the pair of diodes connected to the alternator output and the field winding of the alternator operates on the principle of supplying a direct current to the field winding in response to the received trigger signal. A voltage variation appearing across the load due to variations therein produces a difference or error signal. A time delay in the trigger circuit due to charging of an RC circuit provides a trigger signal that has a phase or time relationship which is controllable. The triggering signal is coupled through a transformer to the silicon controlled rectifier and by causing it to switch from the "off" to "on" position allows current flow through the field coil.

More specifically, a D.C. voltage change corresponding to a load voltage change is detected in the trigger circuit 19 by means of the voltage drop in the regulator resistors 21, 22, 23 and 24. The transistors 25 and 26 are connected in the well known Darlington circuit arrangement for additional gain and thus effectively act as a single high gain transistor. The base 26b of transistor 26 is connected to the emitter 25e of transistor 25. The emitter voltage of transistor 26 is maintained at the Zener voltage of diode 29. A diode 64 is connected between the emitter 26e of transistor 26 and the base 25b of transistor 25 to protect transistors 25 and 26 from excessive positive voltage transients. A diode 65 is connected between collector 26e of transistor 26 and base 25b of transistor 25 to prevent transistors 25 and 26 from going into deep saturation. A capacitor 66 is connected between the base of transistor 25 and the emitter 26e of transistor 26 and a capacitor 67 is connected between the collector 25e of transistor 25 and emitter 26e of transistor 26 to provide filtering of the amplifier voltage.

The net signal which is proportional to the change in voltage across the load 16 is applied to transistors 25 and 26. This change of voltage herein is referred to as an error signal. The D.C. error signal is amplified and effectively applied to capacitor 33 and the transistors 25 and 26 act as a current source for this capacitor. As a result, capacitor 33 will charge at a rate proportional to the magnitude of the error signal. If there is a large error, signal capacitor 33 charges up rapidly, and if small, it would charge slowly. The proper time sequence of the trigger signal with respect to the phase of the alternator is obtained by keeping capacitor 33 discharged until a zero voltage signal is applied to the field 2. Capacitor 33 charges up until the firing voltage of the unijunction transistor 32 is attained. When transistor 32 conducts, a pulse signal is produced which is coupled through the primary winding 35p of a transformer 35 to the secondary winding 35b of that transformer, and thus a triggering pulse is developed across the silicon controlled rectifier 44. This causes the silicon controlled rectifier to switch from an "off" to an "on" condition and current flows through the field 2 of alternator 1.

Figure 2:
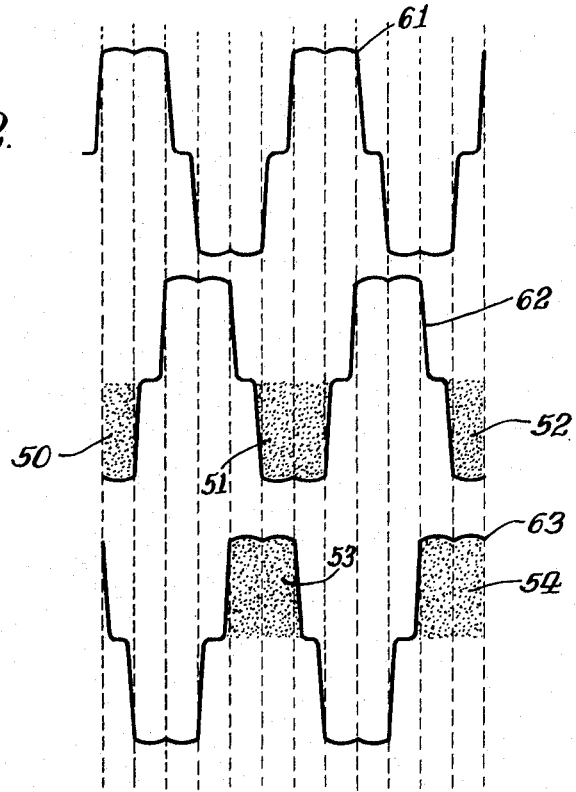
FIGURE 2 shows the phase relationship of the output of an alternator.

Referring now to FIGURE 2, the output of one form of three phase power supply with which the regulator of this invention may be used, herein an alternator, is shown. Therein the three phases' voltage curves are designated 61, 62 and 63, the vertical dashed lines representing time relationships. The shaded voltage waveform areas 50, 51, 52, 53 and 54 in this figure represent the portions of the alternator output that cannot be conducted to the field winding 2 through the silicon controlled rectifier.

Figure 3:
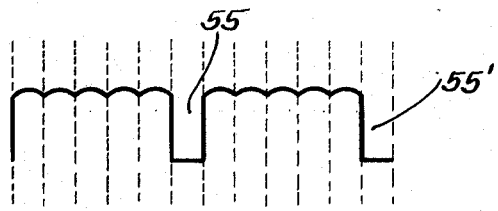
FIGURES 3 and 4 are voltage curves across the field of the alternator.

FIGURE 3 shows the load wave form when there is no time delay (or a zero phase angle). A notch 55 represents a reduction to zero of the voltage across the field coil 2 and corresponds to the period when the areas 51 and 53 of FIGURE 1 are in the same time period. The cycle of operation repeats and a similar notch 55' appears when the areas 52 and 54 correspond.

Figure 4:
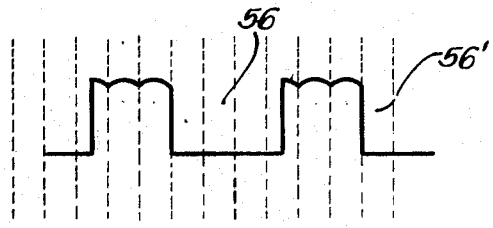

FIGURE 4 differs from FIGURE 3 in that a notch 56 of greater time duration is shown. The period of delay in this instance represents a phase angle of 150 degrees. The delay is caused by the time delay circuit in trigger circuit 19 of FIGURE 1. The delay corresponds to a smaller error signal and this in turn to a lighter load condition than shown in FIGURE 1 which is a full load condition.

With the regulator field control circuit connected as shown, two of the three phases of the alternator will be fully rectified and one-half of the voltage from the third phase will be rectified, resulting in a rectification of five-sixths of the available voltage. Therefore during one-sixth of each complete cycle of the alternator, the voltage applied across the silicon controlled rectifier will be reduced to zero and the rectifier will cease to conduct preventing further current flow from the field of the alternator at this time. By controlling the time in which the silicon controlled rectifier conducts after the occurrence of the zero voltage point (by means of the regulator trigger circuit), variable pulse width control is attained. By this unique method, one silicon controlled rectifier controls the average field power from a rectified three phase source with a single phase delay firing circuit and without the usual reset problems.

In one illustrative specific embodiment of this invention, the circuit components may have the following values:

| | |
|---|---|
| Diodes 43, 45, and 6 | Type 1N2129. |
| R 28 | 150 ohms. |
| R 27 | 150 ohms. |
| Transistor 25 | Type 2N327A. |
| Transistor 26 | Type 2N327A. |
| R 41 | 5600 ohms. |
| R 40 | 2200 ohms. |
| Diodes 38 and 39 | Type 1N482. |
| Transistor 31 | 2N333. |
| Unijunction transistor 32 | 2N491. |
| Resistance R 30 | 2700 ohms. |
| C 33 | .033 Microforad. |

While we have shown and described one embodiment of our invention, it is to be understood that it is capable of many modifications. Changes, therefore, in the construction and arrangement may be made without departing from the spirit and scope of the invention as disclosed in the appended claims.

We claim:

1. Means for regulating the output voltage of a multiple phase alternator having a field winding, as where the output voltage is provided to a variable load, said means comprising: rectifying means connected to the output of said alternator for developing a direct current therefrom; means for detecting a change in said voltage resulting from varying load conditions; regulator trigger means including a high gain amplifier and a time delaying network connected to said detecting means developing a pulse trigger signal in response to said voltage change and for developing a reset signal; and a field winding control means including a semi-conductor switching device coupled between said rectifying means and said field winding for energizing said field winding in response to said pulse trigger signal and for deenergizing said field winding in response to said reset signal.

2. Means for regulating the output voltage of a three phase alternator having a switchable field winding, as where the output voltage is provided to a variable load, said regulating means comprising: rectifying means including a full wave rectifier bridge connected to the output of said alternator for developing a direct current therefrom; means for detecting a change in said voltage resulting from varying load conditions; regulator trigger means connected to said detecting means developing a pulse trigger signal in response to said voltage change and for developing a reset signal; and a field winding control means including a silicon controlled rectifier connected to each of two branches of said rectifier bridge through a pair of diodes and to said field winding for energizing said field winding in response to said trigger signal, and to deenergize said field winding in response to the reset signal when the voltage across said silicon controlled rectifier is reduced to substantially zero.

3. A voltage regulator circuit for controlling the output of an alternator in response to load conditions comprising: a sensing circuit for sensing a difference between the voltage output of an alternator and a predetermined voltage level; amplifying means, coupled to said sensing means, for amplifying the difference between said produced output and said predetermined level; means, coupled to said amplifying circuit, for developing a signal having a rate of change proportional to said amplified difference; first switching means, actuated by said developed signal, for developing a pulse trigger signal; a second switching means actuated by said pulse trigger signal; means, including a field winding of said alternator coupled to said second switching means and a rectifier circuit coupled to the output of said alternator, for adjusting said output of said alternator to correspond to said predetermined level when said second switching device is actuated.

4. A voltage regulator circuit for controlling the output of an alternator in response to load conditions, comprising: a sensing circuit for sensing a difference between the voltage output of an alternator and a predetermined voltage level; amplifying means, coupled to said sensing means, for amplifying the difference between said produced output and said predetermined level; means, coupled to said amplifying circuit, for developing a signal having a rate of change proportional to said amplified difference; first switching means, actuated by said developed signal, for developing a pulse trigger signal; a transformer having a primary and secondary winding, said primary winding connected in series with said first switching means; a second switching means, coupled to said secondary winding, for actuation by said pulse trigger signal; means, including a field winding of said alternator coupled to said second switching means and a rectifier circuit coupled to the output of said alternator, for adjusting said output of said alternator to correspond to said predetermined level when said second switching device is actuated.

5. A voltage regulator circuit for controlling the output of an alternator in response to load conditions, comprising: a sensing circuit for sensing a difference between the voltage output of an alternator and a predetermined voltage level; amplifying means, coupled to said sensing means, for amplifying the difference between said output and said predetermined level; means, coupled to said amplifying circuit, for developing a signal having a rate of change proportional to said amplified difference; first switching means, actuated by said developed signal, for developing a pulse trigger signal; a transformer having a primary and secondary winding, said primary winding connected in series with said first switching means; a second switching means, including a silicon controlled rectifier having anode, cathode, and gate electrodes, said secondary winding connected to said gate electrode; means, including a field winding of said alternator coupled to said cathode electrode and a rectifier circuit coupled to said anode electrode and to the output of said alternator, for adjusting said output of said alternator to correspond to said predetermined level when said silicon controlled rectifier is actuated.

6. The voltage regulator of claim 5 wherein said means for developing a signal includes a capacitor and resistor connected in series having a predetermined time constant.

References Cited in the file of this patent
UNITED STATES PATENTS
3,009,091     Hallidy _____ Nov. 14, 1961